United States Patent
Dude et al.

(10) Patent No.: US 9,366,454 B2
(45) Date of Patent: Jun. 14, 2016

(54) HEATABLE CONNECTION APPARATUS INCLUDING MEDIA-CONDUCTING, ELECTRICALLY HEATABLE HOSES

(71) Applicant: ContiTech Schlauch GmbH, Hannover (DE)

(72) Inventors: Holger Dude, Voehl (DE); Thomas Fuchs, Twistetal (DE)

(73) Assignee: ContiTech Schlauch GmbH, Hannover (DE)

( * ) Notice: Subject to any disclaimer, the term of this patent is extended or adjusted under 35 U.S.C. 154(b) by 544 days.

(21) Appl. No.: 13/919,581

(22) Filed: Jun. 17, 2013

(65) Prior Publication Data

US 2013/0279892 A1    Oct. 24, 2013

Related U.S. Application Data

(63) Continuation of application No. PCT/EP2011/069214, filed on Nov. 2, 2011.

(30) Foreign Application Priority Data

Dec. 15, 2010    (DE) .......................... 10 2010 061 271

(51) Int. Cl.
*F24H 1/00* (2006.01)
*F16L 25/01* (2006.01)
*F16L 53/00* (2006.01)

(52) U.S. Cl.
CPC . *F24H 1/00* (2013.01); *F16L 25/01* (2013.01); *F16L 53/008* (2013.01); *F01N 2610/02* (2013.01); *F01N 2610/10* (2013.01)

(58) Field of Classification Search
USPC .................. 392/471–483; 493/193; 137/341; 219/535
See application file for complete search history.

(56) References Cited

U.S. PATENT DOCUMENTS

| | | | | |
|---|---|---|---|---|
| 2,479,483 A | | 8/1949 | Ekleberry | |
| 2,750,912 A | * | 6/1956 | King ...................... | B21D 39/04 219/221 |
| 3,082,394 A | * | 3/1963 | Hahn ...................... | F16L 37/22 285/315 |
| 3,378,673 A | * | 4/1968 | Hopper ................. | F16L 53/008 138/149 |
| 3,649,949 A | * | 3/1972 | McCarthy ............ | H01R 13/523 439/194 |
| 4,088,269 A | * | 5/1978 | Schlick ..................... | B05B 1/24 137/341 |

(Continued)

FOREIGN PATENT DOCUMENTS

| | | |
|---|---|---|
| DE | 90 04 789 U1 | 6/1990 |
| DE | 102 01 920 A1 | 8/2003 |

(Continued)

OTHER PUBLICATIONS

International Search Report dated Feb. 13, 2012 of international application PCT/EP2011/069214 on which this application is based.

*Primary Examiner* — Dana Ross
*Assistant Examiner* — Renee L Miller
(74) *Attorney, Agent, or Firm* — Walter Ottesen, P.A.

(57) ABSTRACT

A heatable connection apparatus includes electrically heatable hoses and a junction piece having two nipples for corresponding ones of the hoses. Each hose has two electric heating elements embedded therein. The ends of the heating elements are routed out of the hose for connection. The heating elements from one hose end are connected to corresponding ones of the heating elements from the other hose end to form two heating-element pairs lying diametrically opposite one another. Each heating-element pair is bent downward and guided through with the crimp first from above under a bracket of the housing downward toward the housing bottom, from where it is deflected by 90° along the bottom of the junction piece in tight contact therewith. On the opposite side, the heating-element pair is guided upward and pushed with the crimp first from below and through the bracket.

8 Claims, 2 Drawing Sheets

(56) References Cited

U.S. PATENT DOCUMENTS

| | | | | |
|---|---|---|---|---|
| 4,360,158 A * | 11/1982 | Bauer | B60S 1/48 | 239/284.1 |
| 4,471,209 A * | 9/1984 | Hollander | B62J 6/00 | 16/421 |
| 4,484,061 A * | 11/1984 | Zelinka | G01N 30/30 | 137/341 |
| 4,492,951 A * | 1/1985 | Apothaker | C03B 23/076 | 202/236 |
| 4,524,262 A * | 6/1985 | Meyer | E03F 5/08 | 137/297 |
| 4,636,160 A * | 1/1987 | Nagasaka | B29C 45/1782 | 165/168 |
| 4,661,687 A * | 4/1987 | Afkhampour | H05B 3/58 | 392/468 |
| 4,798,230 A * | 1/1989 | Hopperdietzel | B60S 1/48 | 138/103 |
| 4,815,769 A * | 3/1989 | Hopperdietzel | B05B 1/24 | 138/33 |
| 4,912,303 A * | 3/1990 | Beavers | H05B 3/58 | 219/528 |
| 5,245,161 A * | 9/1993 | Okamoto | F16L 53/008 | 219/535 |
| 5,252,157 A * | 10/1993 | Inhofe, Jr. | B29C 33/505 | 156/158 |
| 5,381,511 A * | 1/1995 | Bahar | F16L 11/12 | 138/104 |
| 5,394,507 A * | 2/1995 | Okamoto | F16L 53/008 | 219/535 |
| 5,791,377 A * | 8/1998 | LaRochelle | B60S 1/488 | 138/109 |
| 5,862,303 A * | 1/1999 | Adar | F16L 47/03 | 148/403 |
| 5,883,364 A * | 3/1999 | Frei | H05B 3/58 | 219/535 |
| 5,910,266 A * | 6/1999 | Jones | F16L 53/008 | 219/528 |
| 5,926,922 A * | 7/1999 | Stottle | B29C 45/1782 | 24/20 R |
| 5,933,574 A * | 8/1999 | Avansino | F16L 53/008 | 219/535 |
| 5,961,868 A * | 10/1999 | Schwarzkopf | B29C 45/1782 | 219/535 |
| 6,097,008 A * | 8/2000 | Mahin | E03C 1/122 | 219/213 |
| 6,128,439 A * | 10/2000 | Adar | F16L 47/03 | 138/32 |
| 6,167,883 B1 * | 1/2001 | Beran | A61M 16/1075 | 128/203.17 |
| 6,290,265 B1 * | 9/2001 | Warburton-Pitt | F16L 47/02 | 285/131.1 |
| 6,369,369 B2 * | 4/2002 | Kochman | A41D 13/0051 | 219/528 |
| 6,394,415 B1 * | 5/2002 | Ohmi | F16K 7/14 | 251/129.1 |
| 6,727,481 B1 * | 4/2004 | Wilds | F16L 53/008 | 219/549 |
| 7,402,059 B2 * | 7/2008 | Ciocci | H01R 13/641 | 439/191 |
| 7,687,745 B2 * | 3/2010 | Kertesz | H05B 3/58 | 219/534 |
| 7,708,923 B1 * | 5/2010 | Helicke | B29C 45/14598 | 264/261 |
| 7,721,766 B2 * | 5/2010 | Sawada | H05B 3/58 | 138/121 |
| 7,732,735 B2 * | 6/2010 | Bourget | B05B 7/1693 | 219/221 |
| 7,919,733 B2 * | 4/2011 | Ellis | F16L 53/008 | 138/112 |
| 7,988,130 B2 * | 8/2011 | Ohmi | F16K 7/14 | 251/331 |
| 8,075,020 B2 * | 12/2011 | Colosimo | F01N 3/2066 | 174/47 |
| 8,180,207 B2 * | 5/2012 | Shirai | E03D 9/08 | 392/465 |
| 8,301,020 B2 * | 10/2012 | Wildegger | B60S 1/487 | 219/205 |
| 8,301,021 B2 * | 10/2012 | Beetz | F02M 31/125 | 392/465 |
| 2001/0002669 A1 * | 6/2001 | Kochman | A41D 13/0051 | 219/545 |
| 2002/0008101 A1 * | 1/2002 | Hauschulz | G05D 23/1934 | 219/494 |
| 2002/0023919 A1 * | 2/2002 | Toya | H05B 3/42 | 219/544 |
| 2002/0051633 A1 * | 5/2002 | Kim | F24H 7/0433 | 392/493 |
| 2002/0058436 A1 * | 5/2002 | Saba | F02M 35/10222 | 439/191 |
| 2003/0007789 A1 * | 1/2003 | Pagnella | F16L 53/008 | 392/472 |
| 2003/0034648 A1 * | 2/2003 | Zitkowic, Jr. | F16L 37/144 | 285/120.1 |
| 2004/0118590 A1 * | 6/2004 | Head | B29C 47/0016 | 174/105 R |
| 2004/0146289 A1 * | 7/2004 | Sakamoto | F22B 1/284 | 392/465 |
| 2005/0084255 A1 * | 4/2005 | Kertesz | H05B 3/58 | 392/480 |
| 2006/0037955 A1 * | 2/2006 | Gueugnaut | B29B 13/024 | 219/535 |
| 2006/0289471 A1 * | 12/2006 | Sasaki | H05B 3/58 | 219/535 |
| 2006/0289561 A1 * | 12/2006 | Bourget | B05B 7/1693 | 222/54 |
| 2007/0119848 A1 * | 5/2007 | Ellis | F16L 53/008 | 219/541 |
| 2007/0176418 A1 * | 8/2007 | Frogneborn | H05B 3/58 | 138/103 |
| 2007/0241090 A1 * | 10/2007 | Bourget | B05B 7/1693 | 219/221 |
| 2007/0272679 A1 * | 11/2007 | Lepola | F16L 47/03 | 219/494 |
| 2008/0197124 A1 * | 8/2008 | Shin | H05B 1/0233 | 219/535 |
| 2008/0236810 A1 * | 10/2008 | Bornes | E21B 43/01 | 166/61 |
| 2008/0271801 A1 * | 11/2008 | Sonderegger | H05B 3/58 | 138/33 |
| 2008/0272110 A1 * | 11/2008 | Kamiyama | F16L 53/008 | 219/535 |
| 2008/0298788 A1 * | 12/2008 | Martucci | F16L 53/008 | 392/472 |
| 2009/0127244 A1 * | 5/2009 | Russegger | B29C 45/2737 | 219/267 |
| 2009/0179022 A1 * | 7/2009 | Ellis | F16L 53/008 | 219/228 |
| 2009/0242062 A1 * | 10/2009 | Sawada | H05B 3/58 | 138/32 |
| 2009/0242548 A1 * | 10/2009 | Iida | H05B 3/345 | 219/529 |
| 2010/0046934 A1 * | 2/2010 | Johnson | F24H 1/121 | 392/480 |
| 2010/0175469 A1 * | 7/2010 | Ni | H05B 3/58 | 73/204.27 |
| 2010/0200559 A1 * | 8/2010 | Marcotte | H05B 3/58 | 219/214 |
| 2010/0263740 A1 * | 10/2010 | Borgmeier | F16L 25/01 | 137/341 |
| 2010/0269917 A1 * | 10/2010 | Schild | B32B 1/08 | 137/341 |
| 2011/0159139 A1 * | 6/2011 | Galati | B29C 45/2737 | 425/547 |
| 2011/0299838 A1 * | 12/2011 | Galati | B29C 45/2737 | 392/468 |
| 2012/0103958 A1 * | 5/2012 | Wallinger | H05B 3/58 | 219/201 |

FOREIGN PATENT DOCUMENTS

| | | |
|---|---|---|
| EP | 1 329 660 A2 | 7/2003 |
| EP | 1 513 227 A1 | 3/2005 |

* cited by examiner

HEATABLE CONNECTION APPARATUS INCLUDING MEDIA-CONDUCTING, ELECTRICALLY HEATABLE HOSES

CROSS REFERENCE TO RELATED APPLICATIONS

This application is a continuation application of international patent application PCT/EP2011/069214, filed Nov. 2, 2011, designating the United States and claiming priority from German application 10 2010 061 271.5, filed Dec. 15, 2010, and the entire content of both applications is incorporated herein by reference.

FIELD OF THE INVENTION

The invention relates to a heatable connection apparatus including media-conducting, electrically heatable hoses. The connection apparatus includes a junction piece which has two connection nipples for respective hose ends and has a further connection communicating with the conduit interior. Each hose is provided with two electrical heating conductors embedded in the hose at least over part of the length of the hose. The ends of the heating conductors are routed out of the hose in order to form a connection with an electrical component.

BACKGROUND OF THE INVENTION

A wide variety of electrically heatable hoses for use in motor vehicles are known. The medium flowing between two connection points in these hoses is heated by these hoses.

A heatable hose having at least one electrical heating conductor which serves to heat a medium flowing in the hose is known, for example, from DE 102 01 920 A1, wherein the heating conductor extends over at least part of the length of the hose and is composed of a metal core and a sheath.

The heating conductor is usually embedded in a layer of the hose. In a multi-layer hose, the heating conductor can also be arranged between two layers. The ends of the heating conductor are exposed in order to be able to connect them to a voltage source which is required for operating the heating conductor. The exposed ends of the heating conductor are usually arranged at one end of the hose. However, it is also possible for an exposed end of the heating conductor to be arranged at each end of the hose.

The exposed ends of the heating conductor are provided with an electrical connection (plug) and are then connected to a voltage source. Since the voltage source is usually not arranged directly at the hose, the exposed ends of the heating conductor have to have a predefined length in order to form a connection to the voltage source via the plug.

The heatable hose line preferably has two helical heating conductors which are supplied with power at one end and are short-circuited at the other end. This ensures that the line is heated.

EP 1 329 660 B1 discloses a flexible multi-layer heatable hose having at least one reinforcement layer and an elastomeric outer layer as well as an electrical heating conductor which is used for heating a medium flowing in the hose. The heating conductor extends over at least part of the length of the hose and is composed of a metal core and a sheath, wherein the heating conductor is embedded outside the outer stratum of the reinforcement layer but under or within the elastomeric outer layer. In order to permit simple and reliable electrical contact to be made between the heating conductor and a voltage source, the elastomeric outer layer is less strong than the heating conductor and is dimensioned such that the heating conductor can be exposed by means of a radially outwardly acting force by cutting through the original or weakened elastomeric outer layer, but without damaging its metal core and its sheath, and can be connected directly to an electrical connection. The heating conductor preferably runs beneath or within the elastomeric outer layer in a helical manner at least over part of the length of the hose.

The described technology of the heatable hoses has been proven to be useful when transporting liquid media between two connection points or connection nipples of motor vehicle assemblies, for example storage tank, injection unit, pump et cetera. However, in particular applications, it has been found that the liquid medium can freeze in the hose connection nipples of the connecting blocks which are usually in the form of standardized plug connections, in particular quick-action plug connectors, and are arranged at the ends of the hose.

This risk of freezing occurs particularly in exhaust-gas aftertreatment systems for reducing nitrogen oxide emissions from an internal combustion engine. In this case, nitrogen oxide is converted into atmospheric nitrogen and water vapor with the aid of selective catalytic reduction technology (SCR). The reducing agent used is an aqueous urea solution which is carried along in a separate storage container. The aqueous urea solution is fed out of the storage container by means of a delivery module or a pump and is supplied to a metering module, from which the urea solution is injected in a metered manner into the exhaust-gas flow upstream of the catalytic converter. Excess reducing agent is conducted from the delivery module back into the storage container via a return line.

Hose lines for conveying the reducing agent are provided between the storage container, the delivery module and the metering module. These hose lines have to be connected to said assemblies in order to establish the fluid connection.

For the hose connections to the assemblies, it is possible to insert the quick-action plug connectors, which are standardized in the automobile industry, at the hose ends, the receptacle parts of these hose ends being mounted on the assemblies ex-factory. The quick-action plug connectors (quick connectors) have the advantage of rapid mounting of the hose and a wide variety of embodiments of the quick-action plug connectors are known. They are most frequently designed as a "male part" on the assemblies and as a "female part" on the hose ends, the latter having a connection nipple for the hose end, onto which the end of the hose which is to be connected is pushed and fastened such that it is media-tight.

The hose lines between the reservoir container and the exhaust gas line have to be capable of being heated, since below −11° C. there is a risk of the aqueous urea solution freezing. It is known to avert the risk of freezing by using the known, electrically heatable hoses. Although these electrically heatable hoses have been proven to be useful, in extreme applications the plug connectors are the weak point of the exhaust-gas treatment systems in respect of the risk of freezing. There is still a risk of freezing in the plug connections themselves.

In order to provide an apparatus which protects against freezing of the aqueous urea solution even in the connections of the hose lines to the assemblies which are to be connected, it has already been proposed to use connecting blocks which can be heated by cooling water for the hose connections. These connecting blocks are designed in such a way that the cooling water, of which the temperature can be controlled, is flushed through them. As a result, both the hoses and the plug connectors can be thawed.

The use of special quick-action plug connectors (quick connectors) which have a separate electrical heating element (for example a heatable ceramic component) is also known. This has the disadvantage of being a very expensive and complex solution which also requires an additional electrical connection (plug).

In order to measure the concentration of urea in the solution during the injection process, a sensor is inserted into the pipe or hose line via a junction piece (T piece, Y piece), wherein the hose line has to be disconnected. The region of the junction piece is also subject to the risk of freezing. This region of the hose line should therefore be electrically heated too. However, no heatable designs are known for these junction pieces at present because two hose ends meet at a disconnection interface.

SUMMARY OF THE INVENTION

It is an object of the invention to provide a connection apparatus in which the entire line branch, that is to say the hose and the connection points of the hose and the assemblies which are to be connected, can be continuously and directly heated and which is distinguished by a cost-effective solution with a low level of technical complexity.

In the region of the junction piece, the two heating conductors are routed from each hose line end and each of the two heating conductors is crimp-connected to corresponding ones of the heating conductors of the other hose end, with the result that there is an electrical continuity and the current can flow. There are therefore two crimped heating conductor pairs, one on each side of the housing.

Each heating conductor pair is bent downward in a pressed together manner and by way of the crimp point is routed first from above beneath a lateral bridge bracket of the housing of the junction piece downward in the direction of the housing base, from where it is deflected through 90° and placed around the base of the junction piece in close contact with the housing. On the corresponding opposite side, each heating conductor pair is routed upward again and, by way of the dedicated crimp location, is first passed from below through the bridge bracket, which forms a kind of locking bar, of the housing and is therefore positioned in this location.

Therefore, each crimped heating conductor pair is bent downward and deflected through 90° around the base of the junction piece and routed upward again on the opposite side. This arrangement, which includes the junction piece, ensures that enough electrical heating power is provided to ensure that the aqueous urea solution does not freeze in the region of the junction piece and, in the event of the aqueous solution freezing, it can thaw in the region of the junction piece.

In an advantageous embodiment of the invention, the two bridge brackets are arranged opposite one another on the outside of the housing and each bridges an axial channel. The axial channels are machined into the surface of the cylindrical housing of the junction piece. The crimped heating conductors are placed and thus routed in the channels or grooves.

In a further advantageous embodiment of the invention, the heating conductor pairs are placed and routed in the channels, one arriving from above, and one arriving from below the housing base.

In a further advantageous embodiment of the invention, the junction piece, which is assembled with the heating conductor pairs, is encapsulated with a plastics material. The structure is protected from external influences as a result.

In a further advantageous embodiment of the invention, the potting layer of the plastics material is composed of polyurethane or polyamide.

By virtue of the junction piece, which can be heated in this way, the entire conduit branch of the urea solution from the storage container up to the exhaust-gas line can be heated continuously and directly. There is no longer a cold bridge or blockage within the conduit branch. It is no longer possible for the junction piece to freeze. The heating conductors from the existing hose line which are already present are used for heating the junction piece. There is no longer any need for an additional electrical connection for heating the junction piece.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
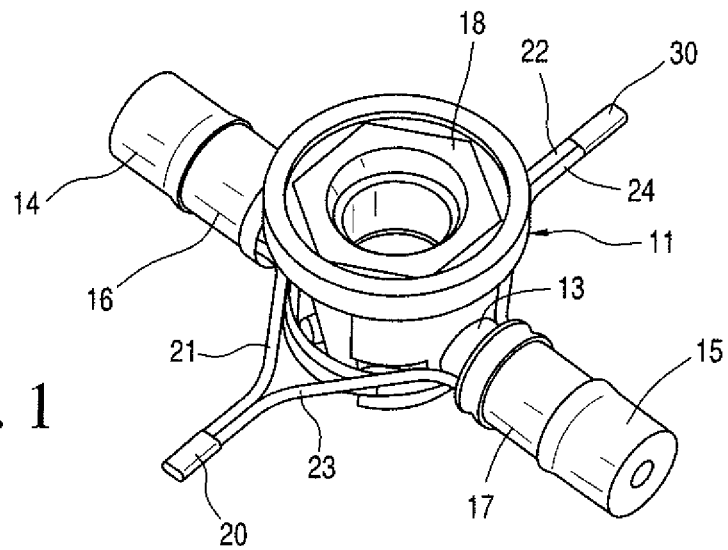
FIG. 1 is a perspective view of a junction piece which is inserted into a hose line and which has two connecting nipples for firmly holding respective end regions of two electrically heatable hoses.
Figure 2:
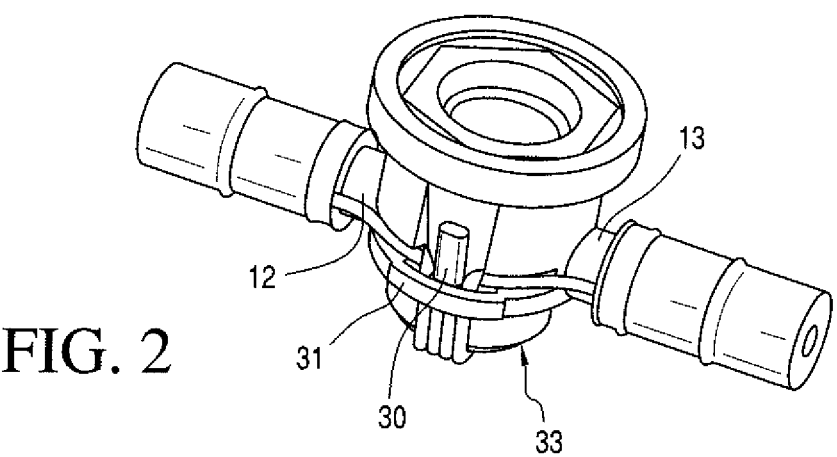
FIG. 2 is a side perspective view of the junction piece having two heating conductor pairs which run axially on the housing of the junction piece.
Figure 3:
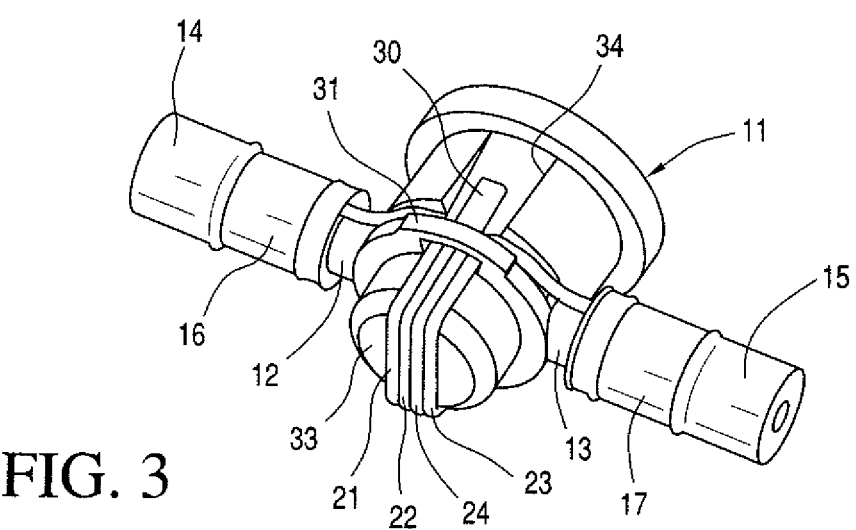
FIG. 3 shows a tilted perspective side view of the junction piece.
Figure 4:
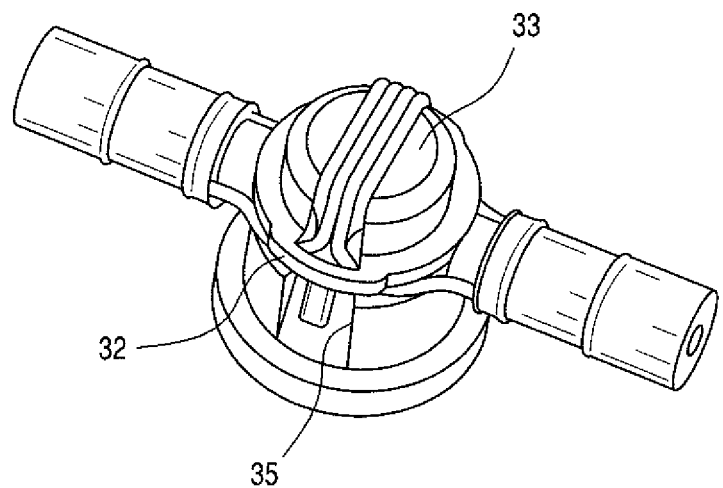
FIG. 4 shows a perspective view of the bottom of the junction piece with two heating conductor pairs fitted; and, FIG. 5 shows the junction piece encapsulated with polyurethane (PUR) or polyamide (PA).

The junction piece 11 shown in FIGS. 1 to 4 has two diametrically opposite connecting nipples (12, 13), onto each of which the respective ends of electrically heatable hoses (14, 15) are pushed. The hose ends 14 and 15 are fixed on the respective ones of the hose connecting nipples (12, 13) by corresponding press sleeves (16, 17).

The junction piece 11 has an internal threaded connection 18 for the sensor (not shown) which, as a mating piece, has an external threaded connection which was already fitted ex-factory and is mounted by a simple threaded engagement.

The two hoses (14, 15), which are shown only by way of their corresponding short end sections, are heated by respective sets of heating conductors (21, 22) and (23, 24), often also referred to as heating wires, which are integrated in the respective hose structures. In order to connect the heating conductors (21, 22) of one hose end (hose 14) to the heating conductors (23, 24) of the other hose end (hose 15), the individual heating conductor sets (21, 22) and (23, 24) are stripped at the corresponding ends of the hoses (14, 15).

The free stripped end of the heating conductor 21 of one hose end (hose 14) is crimped to the free stripped end of the heating conductor 23 of the other hose end (hose 15) via a metal sleeve 20. This crimped heating conductor pair (21, 23) is situated on one peripheral side of the junction piece 11. The heating conductor 22 of one hose end (hose 14) is likewise crimped to the heating conductor 24 of the other hose end (hose 15) via a further metal sleeve 30. This crimped heating conductor pair (22, 24) is situated on the other peripheral side of the junction piece 11.

The crimped heating conductor pairs (21, 23) and (22, 24) are bent downward in a pressed together manner and, by way of the corresponding crimp sleeves (20, 30), are routed first from above beneath corresponding lateral bridge brackets (31, 32) of the housing 11 downward in the direction of the housing base 33. There, the heating conductor pair is deflected through 90° and placed around the base 33 of the junction piece 11 in close contact with the housing. The crimped heating conductor pairs (21, 23) and (22, 24) are then routed upward again on correspondingly opposite sides and, by way of the respective crimp sleeves (20, 30), are first passed from below through corresponding bridge bracket (31, 32), which form respective holding devices of the housing 11, and are therefore held at these locations.

The two bridge brackets (31, 32) are arranged opposite one another and bridge respective axial channels (34, 35). The axial channels are integrated in the surface of the cylindrical housing of the junction piece 11. The heating conductor pairs (21, 23) and (22, 24) are placed and therefore routed in these corresponding channels (34, 35), one arriving from above, and one arriving from the base 33.

Figure 5:
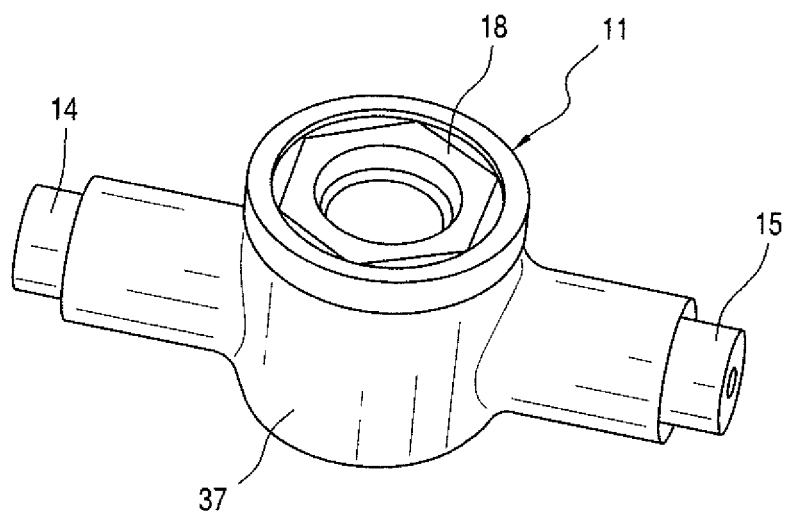

In order to protect this assembled structure against external influences, the assembled junction piece 11 is then encapsulated with PUR or PA (FIG. 5). The potting layer 37 produced in this way covers the heating of the junction piece 11. The heating conductor sets (21, 22) and (23, 24) are insulated and protected.

It is understood that the foregoing description is that of the preferred embodiments of the invention and that various changes and modifications may be made thereto without departing from the spirit and scope of the invention as defined in the appended claims.

LIST OF REFERENCE SYMBOLS (Part of the Description)
- 11 Junction piece; housing
- 12 Connecting nipples
- 13 Connecting nipples
- 14 Electrically heatable hose
- 15 Electrically heatable hose
- 16 Press sleeve
- 17 Press sleeve
- 18 Internal threaded connection
- 20 Crimp sleeve
- 21 Heating conductor
- 22 Heating conductor
- 23 Heating conductor
- 24 Heating conductor
- 30 Crimp sleeve
- 31 Bridge bracket; locking bar
- 32 Bridge bracket; locking bar
- 33 Housing base
- 34 Channel
- 35 Channel
- 37 Potting layer

What is claimed is:

1. A heatable connection apparatus comprising:
a first media-conducting, electrically heatable hose having a first hose end and defining a first hose length;
first and second electrical heating conductors embedded over at least a portion of the first hose length;
a second media-conducting, electrically heatable hose having a second hose end and defining a second hose length;
third and fourth electrical heating conductors embedded over at least a portion of the second hose length;
said first and second heating conductors having respective end segments guided out of the end of said first heatable hose and said end segments being stripped of insulation;
said third and fourth heating conductors having respective end segments guided out of the end of said second heatable hose and said end segments of said third and fourth heating conductors being stripped of insulation;
a junction piece having first and second connecting nipples for receiving corresponding ones of said first and second hose ends thereon;
said stripped end segments of said first and second heating conductors being connected to corresponding ones of said stripped end segments of said third and fourth heating conductors so as to define first and second heating conductor pairs;
a first crimp sleeve joining the stripped end segments of said first and third heating conductors to define an end region of said first conductor pair;
a second crimp sleeve joining the stripped end segments of said second and fourth heating conductors to define an end region of said second conductor pair;
said junction piece having a housing defining an outer periphery and first and second sides lying opposite each other;
first and second bridge brackets formed on said first and second sides, respectively;
said housing having a base in spaced relationship to said first and second bridge brackets;
said first crimp sleeve and said second crimp sleeve being arranged diametrically opposite to each other at said outer periphery of said junction piece;
said first heating conductor pair being pressed together and bent downward and with said first crimp sleeve being guided first from above beneath said first bridge bracket in the direction of said base whereat said first heating conductor pair is deflected 90° and is disposed around said base in close contact with said housing;
said second heating conductor pair being pressed together and bent downward and with said second crimp sleeve being guided first from above beneath said second bridge bracket in the direction of said base whereat said second heating conductor pair is deflected 90° and is disposed around said base in close contact with said housing;
said end region of said first heating conductor pair being configured to be guided upward on said second side and passed through underneath said second bridge bracket which is configured to form a second latch and thus position said end region of said first heating conductor pair at this location; and,
said end region of said second heating conductor pair being configured to be guided upward on said first side and passed through underneath said first bridge bracket which is configured to form a first latch and thus position said end region at this location.

2. The heatable connection apparatus of claim 1, wherein:
said housing has a cylindrical shape and defines a surface having a first groove and a second groove for accommodating heating conductor pairs; and,
said first bridge bracket bridges said first groove and said second bridge bracket bridges said second groove.

3. The heatable connection apparatus of claim 1, wherein:
said housing has a cylindrical shape and defines a surface having a first channel and a second channel; and,
said first bridge bracket bridges said first channel and said second bridge bracket bridges said second channel.

4. The heatable connection apparatus of claim 2, wherein:
said first channel being configured to have said first heating conductor pair inserted and guided therein in said downward direction and to have said second heating conductor pair inserted and guided therein in a direction opposite to said downward direction; and,
said second channel being configured to have said second heating conductor pair inserted and guided therein in said downward direction and to have said first heating conductor pair inserted and guided therein in a direction opposite to said downward direction.

5. The heatable connection apparatus of claim 1, wherein the heatable connection apparatus is encapsulated by a plastic material together with said first and said second heating conductor pairs.

6. The heatable connection apparatus of claim 5, where said plastic material is one of polyurethane and polyamide.

7. The heatable connection apparatus of claim 1, wherein said junction piece defines a conduit through said housing interconnecting said first and second connecting nipples; and, said housing has a receptacle formed therein and communicating with said conduit.

8. The heatable connection apparatus of claim 7, wherein said receptacle is configured to accommodate a sensor mounted therein.

* * * * *